(12) United States Patent
Wells (10) Patent No.: US 7,376,418 B2
(45) Date of Patent: May 20, 2008

(54) SYSTEM AND METHOD FOR MULTIPLE ACCESS CONTROL IN SATELLITE COMMUNICATIONS SYSTEM

(76) Inventor: Loren L. Wells, Calle Santa Lucia No. 27, Barrio Monte Verde, Casilla Postal No. 3882, Santa Cruz (BO)

( * ) Notice: Subject to any disclaimer, the term of this patent is extended or adjusted under 35 U.S.C. 154(b) by 602 days.

(21) Appl. No.: 10/936,614

(22) Filed: Sep. 8, 2004

(65) Prior Publication Data

US 2006/0050660 A1    Mar. 9, 2006

Related U.S. Application Data

(60) Provisional application No. 60/501,188, filed on Sep. 8, 2003.

(51) Int. Cl.
*H04Q 7/20* (2006.01)

(52) U.S. Cl. .................. 455/427; 455/428; 455/430

(58) Field of Classification Search ............... 702/76, 702/77; 455/3.02, 3.03, 3.04, 12.1, 453, 455/427, 428, 430; 701/30, 31, 32

See application file for complete search history.

(56) References Cited

U.S. PATENT DOCUMENTS 6,070,052 A * 5/2000 Ogasawara et al. ........ 455/13.1

2002/0146979 A1 * 10/2002 Regulinski et al. ........ 455/13.1
2005/0265273 A1 * 12/2005 Karabinis et al. ........... 370/316

OTHER PUBLICATIONS

"Multiple-Access Protocols" http://mars.mcs.kent.edu/ksuthesis/node13.html, dwieser@mcs.kent.edu, Aug. 11, 2004.
Kleinrock "On Resource Sharing in a Distributed COmmunication Environment" IEEE Communications Magazine, Jan. 1979—vol. 17, No. 1, Reprinted May 2002, pp. 58-64.

* cited by examiner

*Primary Examiner*—Jean A. Gelin
*Assistant Examiner*—Shannon R. Brooks
(74) *Attorney, Agent, or Firm*—Jordan M. Meschkow; Lowell W. Gresham; Charlene R. Jacobsen (57) ABSTRACT

A satellite communications system (10) includes a hub (14), a satellite (32), and any number of remote terminals (16). Each remote terminal (16) includes a remote receiver (38), a monitor (40), and a network access controller (42). Each remote receiver (38) is configured to receive and down convert the system's entire spectrum of interest from which channels are accessed by the remote terminals (16). The monitors (40) independently perform FFT processes over this entire spectrum, but at a low frequency resolution which is no higher than needed to distinguish channels. Based on these spectral analyses, uplink/inbound channels are independently selected by the network access controllers (42) at each remote terminal (16). Remote terminals (16) immediately transmit data to the hub (14) as soon as they select an uplink/inbound channel.

20 Claims, 6 Drawing Sheets

SYSTEM AND METHOD FOR MULTIPLE ACCESS CONTROL IN SATELLITE COMMUNICATIONS SYSTEM

RELATED INVENTION

The present invention claims benefit under 35 U.S.C. 119(e) to "System and Method for Multiple Access Control in Satellite Telecommunications Systems,". U.S. Provisional Patent Application Ser. No. 60/501,188, filed Sep. 8, 2003, which is incorporated by reference herein.

TECHNICAL FIELD OF THE INVENTION

This invention relates generally to the field of satellite communications systems. More particularly, it relates to a system and method that provides for the control of multiple remote terminals and their access to satellite communications systems.

BACKGROUND OF THE INVENTION

Communication using satellite transmission links has become common in recent history. Television, voice traffic, data transfer and a wide variety of other communication types are now routinely sent via satellite. As satellite networks are utilized to provide a medium for more recently developed communications types, satellite network providers and administrators face ongoing challenges in fulfilling this demand. In particular, with the explosion of the Internet as a communications vehicle, the transmission of Internet protocol (IP) traffic via satellite has presented a unique set of challenges. IP, along with electronic mail (e-mail), closed network communications, and the like, reflect the variety of such communication types.

Two of the largest costs for operating a satellite communications network are the use of the satellite's transponder bandwidth, or space segment, and the capital expenditure in both hardware and software associated with the establishment of the network. For many years the use of Single Channel per Carrier (SCPC) satellite links provided an effective communication means for point-to-point connectivity. In SCPC, a satellite channel is reserved for a particular use. Although SCPC provided excellent access, the satellite transponder bandwidth used by a channel resulted in high space segment cost even in low utilization scenarios. In order to reduce space segment costs, there has been a major effort in the satellite communications industry to develop bandwidth management solutions resulting in lower operating costs. This effort has been ongoing over the past several decades. Previously, any reasonable cost could be supported in terrestrial hardware and software, and would be compensated by reduced space segment cost. In today's market however, the falling price of space segment has dictated that terrestrial segment costs must be lowered substantially as well, in order to address a broader market.

One approach to managing satellite bandwidth that has been in use over this time frame is Time Division Multiple Access (TDMA). TDMA divides the satellite bandwidth into time slots that are dedicated to each remote site in a satellite communications network, the network comprising one or more hub sites and multiple remote user sites. The hub sites and the remote sites may be linked via the satellite in a wide variety of architectures well known in the art, including mesh and star architectures, to name two. By time-allocating access to a satellite channel among multiple remote sites, TDMA networks such as the Skystar Advantage® satellite systems provided by Gilat Spacenet of McLean, Va., and the X. Star satellite systems provided by STM Wireless, Inc, of Irvine, Calif. have more efficiently used the space segment and reduced operating costs. In the present terminology, Very Small Aperture Terminal (VSAT) networks typically refer to networks that use some variation of TDMA. Many variations of TDMA have been developed and include Slotted ALOHA, Multiple Frequency TDMA (MF-TDMA) and Selective TDMA (STDMA), to name a few.

Conventional TDMA based networks require an excessively complex and expensive Network Management System (NMS) at the hub. The NMS utilizes centralized network management software to control access to the network by the remote sites, thereby supervising the traffic over the network. The core code for this software is complex and expensive to change resulting in the use of network management logic, which was developed over a decade ago and is not adaptable to changes in network traffic characteristics. Additionally, the capital costs of the hub station electronic equipment are significant. If the network comprises many hundreds of sites, the hub cost becomes a less significant factor as it is amortized over the large number of remote sites. However, for small-to-medium networks of fewer than 1000 sites, the hub capital costs can be prohibitive.

Another disadvantage of TDMA is the limited throughput of the remote sites, particularly during network peak usage periods. TDMA systems utilize equipment that operates in the burst mode to time allocate the space segment. As will be known by one of ordinary skill in the art, because TDMA divides bandwidth into time slots, the aggregate throughput of any satellite channel is limited to the bandwidth of the shared channel, and as the number of remote sites increases, each site's time slot is reduced and the total throughput for each site decreases. As a result, the network average throughput decreases due to the overhead associated with each burst. Some TDMA systems such as MF-TDMA have tried to mitigate this decrease in throughput by jumping (Frequency Hopping) between multiple TDMA channel frequencies. This scheme, however, adds cost and time delay to the system. There are also a number of complex timing considerations with MFTDMA systems that affect network elements interdependently. These factors are, among others, differences in range to the satellite from the earth station, buffer hold time, and frequency uncertainty.

Another commonly used bandwidth management scheme in VSAT networks is Demand Assigned Multiple Access (DAMA). DAMA allows a pool of satellite channels to be shared among multiple user sites on an on-demand basis and is an efficient and logical network topology for satellite systems. DAMA reduces space segment operating costs for networks with remote sites that require full mesh connectivity, but do not require full time communication circuits. Bandwidth-on-demand and rural telephony are examples of popular DAMA applications.

In DAMA, idle satellite transponder bandwidth is available for any remote user site in the network when requested as long as it is not currently in use. The bandwidth becomes available for a requesting user at a remote site upon the completion of its use by another user at a remote site. By sharing the available bandwidth among multiple users, DAMA systems such as the FaraWay™ satellite telephony systems provided by Gilat Spacenet, and the rural telephony systems provided by STM Wireless, Inc., deliver cost-effective use of the satellite space segment.

One disadvantage of DAMA systems is that they are hardware intensive resulting in high capital costs when compared to similarly configured star SCPC networks. In addition to a complex and costly NMS, DAMA systems require one or more network control channels with associated hardware for network management. The control channel manages traffic by passing requests for bandwidth channel use among remote sites and the network manager at the hub site. They require a control channel modem (or modems, depending on the size of the network) at each remote site and at the hub site, and a network management computer and complex network management software at the hub.

Another disadvantage of DAMA is slow communication link set up times. In a DAMA network, when a remote site sends a request to establish a communication link, the request is sent over the control channel to the NMS. The NMS sends an acknowledgement message to the remote and determines bandwidth availability on the satellite transponder. When the determination is made that a channel is available, the NMS allocates bandwidth to the remote by sending a command over the control channel, which tunes a remote traffic modem to the center frequency of the available channel and turns the transmitter on. This process is time consuming due to the satellite round trip times of the remote requests and acknowledgements and the commands from the hub. With several trips up to and back from the satellite, which are a minimum of 240 milliseconds in propagation delay for each direction of the trip, the time to set up a circuit can easily grow to several seconds.

The differences in bandwidth usage by DAMA and TDMA lend each to be more effective in certain applications. Typically, DAMA has been used for rural voice networks and circuit restoral systems, and TDMA has been used for Point of Sale systems, other transactional data networks, and, more recently, IP networks.

With the explosion of the Internet and the rapid adoption of IP as a transport protocol for telecommunications networking, the disadvantages of capital cost intensive VSAT networks with slow response times resulting from long set-up or reduced throughput during high usage scenarios has created a need for a satellite access scheme that that is cost effective and works efficiently in an IP environment. Many companies in the satellite networks business have attempted to adapt TDMA and DAMA for IP transport over satellite, but have had limited success.

A simple application for DAMA in an IP environment is to use it in a manner similar to a dial-up Internet connection. This, however, is an inefficient use of satellite bandwidth resulting in high operating costs. It is akin to dialing into an Internet Service Provider (ISP) via an expensive long distance telephone line and staying connected for periods of time; and, the cost gets very large very quickly. Additionally, IP networks have difficulty functioning properly due to the slow circuit set-up. Routers functioning in a DAMA network start sending route broadcasts to let the destination site know that the route is available. The DAMA system, therefore, establishes a circuit every time the router updates its tables. This may be as frequently as several times a second, but normally is every 2 to 5 seconds. The destination router then acknowledges the receipt of the route updates and recognizes the availability to interchange data.

Subsequent to the adaptation of TDMA and DAMA systems for IP use, a technique was developed for one-way transport of IP data via satellite. This technique uses a standard protocol known as Digital Video Broadcast (DVB) developed for broadcast digital video transport and commonly referred to as an MPEG2 Transport Stream. These systems statistically multiplex an IP stream and encapsulate the IP onto DVB frames using an IP encapsulator. The encapsulator output is fed to a DVB modulator and multicast to multiple receive-only sites via satellite. This technique is commonly referred to as DVB-IP. The DVB-IP equipment manufacturers have adopted a standard within DVB-IP called Multiple Protocol Emulation (MPE). This standard allows any MPE compliant receiver to interoperate with any other manufacturer's IP encapsulator. The receive equipment at the remotes are called Integrated Receiver Decoders (IRD) and are standardized and readily available from a large number of vendors. DVB-IP equipment is produced using large volume manufacturing techniques and shares components with Direct to Home (DTH) television receivers, resulting in very inexpensive equipment.

DVB-IP has proved to be an effective technique for point to multipoint distribution of IP data via satellite. One example is delivering IP backbone connection to far-flung ISPs. Using DVB-IP for delivering downstream data to ISPs is cost effective due to the asymmetrical nature of ISP circuits. The limitation of the DVB-IP system architecture is the upstream (return) path. To date, most networks using DVB-IP are strictly one-way, or use terrestrial links such as dial-up leased lines for the upstream return path. The throughput requirement for the return channel very much depends on the application. If the purpose of the circuit is basic web surfing, the upstream throughput requirement is relatively small. Typically, the downstream to upstream data ratio for ISP backbone access is between 8/1 and 15/1. In many cases, however, the reason for using VSAT systems is the lack of other communications infrastructure. If the station is in a remote area, there may be no dial-up connection for the return path.

An effective solution to the problems associated with the lack of infrastructure is to use SCPC links for the return path. This is what overseas ISP's such as Reach Global Services, Ltd. of Hong Kong use for their Internet backbone connection. An ISP can serve thousands of subscribers with a Committed Bit Rate (CBR) of 2 Mb/s and an SCPC return channel of 128 or 256 Kb/s. Many major satellite operators are currently offering these types of services to ISPs worldwide. Such services include SPOTbytes, the Internet service delivered by PanAmSat Corporation of Wilton, Conn.

SCPC return channels, however, necessitate a separate carrier for each return link. These channels are dedicated full-time to a single link, are usually not fully utilized, and require guard bands between the channels. This spectral inefficiency is very costly, particularly for medium or large networks. Additionally, if the network application is corporate communications, including voice and fax calls, file transfers, e-mail and other services, the demands on the upstream channel are much greater.

Some VSAT equipment vendors have adapted TDMA systems to be used as return channel solutions for DVB-IP systems since IP traffic is very bursty and TDMA lends itself well to burst traffic. Also, the periodic router updates previously mentioned herein function more effectively if they have a constant connection as provided by TDMA rather than the "on request" connection as provided by DAMA. These TDMA based DVB-IP systems, however, suffer from the cost and performance limitations outlined above. That is, the hub equipment is very expensive and throughput is limited when network loads are heavy.

Standardization for TDMA and DAMA based satellite systems has been slow to develop mainly due to the large number of variations required to accommodate the applications and architectures, which they serve. The adaptation of these systems for different applications requires considerable modification. A standard for Internet service over satellite recently promoted by the DVB community is return channel satellite DVB (DVB-RCS) that is based on traditional TDMA technologies. There is also a DVB (DVB-RCT) standard for terrestrial applications and cable systems (DVB-RCC). DVB-RCS is a TDMA based return channel solution designed to serve networks of thousands of sites, and is more targeted at the consumer/SOHO/small enterprise market. This standard was developed in an effort to emulate the success enjoyed by the DVB/MPEG-2 video standard specification. Since the MPEG-2 specification was intended to allow digitally compressed video to be transmitted to a variety of manufacturers' equipment, the MPEG-2 equipment for the hub-to-remote circuit is completely standardized. Many vendors manufacture equipment for this market and it is readily available at very low cost.

The effort to standardize DVB-RCS has foundered, however, due at least in part to the very high complexity and cost of the hub systems. These systems have not performed as effectively as expected. Furthermore, the standard does not address the medium-to-large enterprise network market.

In view of the above discussion, there exists a need for a system and method that provide for the control of multiple remote terminals and their access to satellite communications systems.

SUMMARY OF THE INVENTION

It is an advantage of the present invention that an improved system and method for multiple access control in a satellite communications system is provided.

Still another advantage of the invention is to provide such a system and method that utilizes bandwidth effectively and is cost effective to operate.

It is yet another advantage of the invention is to provide such a system and method with short set-up times.

Another advantage of the invention is to provide such a system and method that maintains high throughput characteristics in the presence of increased communication traffic.

Yet another advantage of the invention is to provide such a system and method that is adaptable to a wide variety of communication types.

Still another advantage of the invention is to provide such a system and method that is both scalable and extensible.

It is yet another advantage of the invention to provide such a system and method that is readily standardized.

These and other advantages are realized in one form by an improved method of accessing channels in a satellite communications system. The method calls for receiving a broadband signal occupying a predetermined portion of the electromagnetic spectrum and broadcast by a satellite to include a plurality of downlink channels. A portion of the spectrum occupied by the broadband signal is identified as having power below a predetermined threshold. This portion of the spectrum is translated into an identity of an uplink channel. And, a transmission is emitted to the satellite using this uplink channel.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
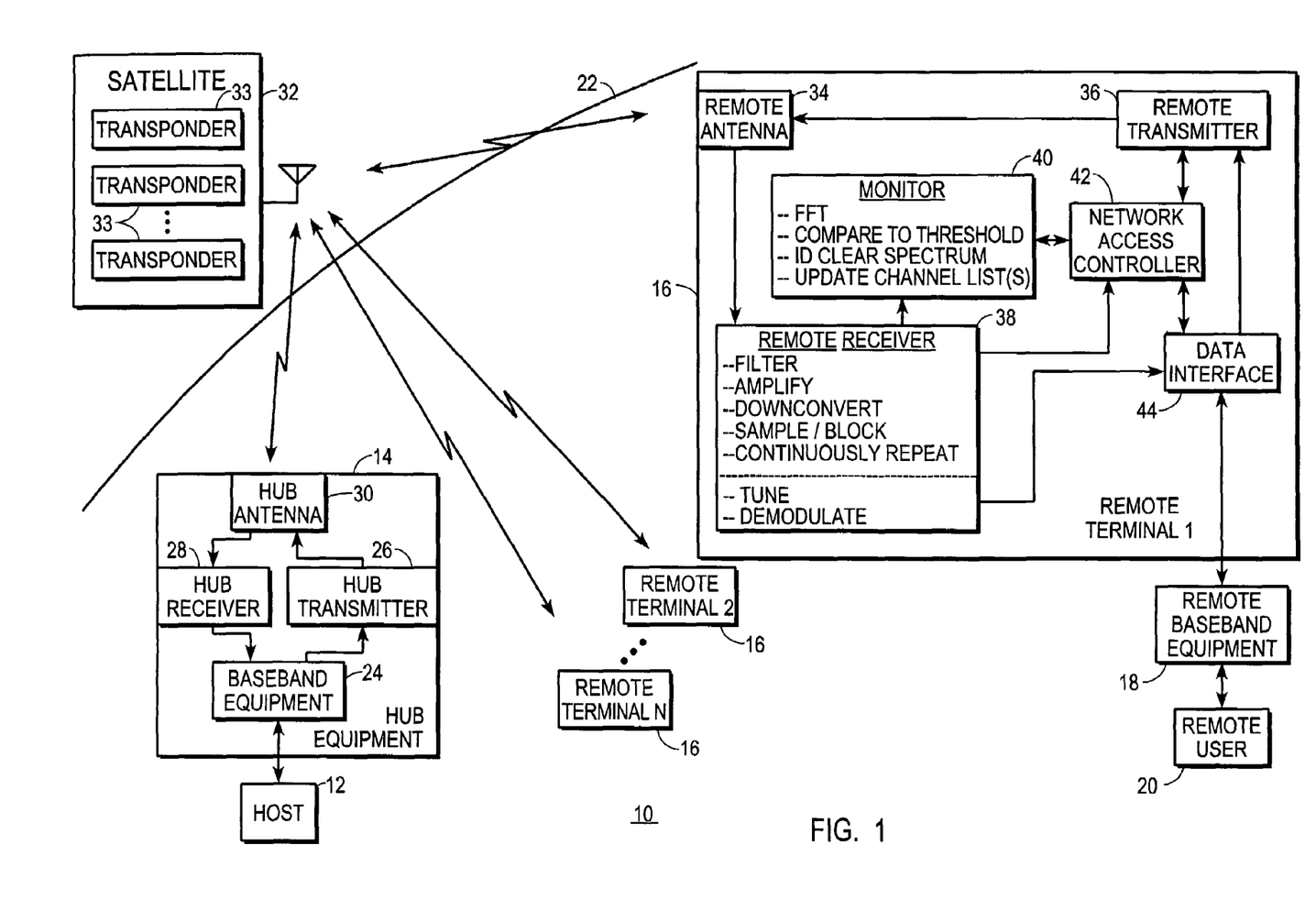
FIG. 1 is a functional system block diagram of one of the presently preferred embodiments of the invention.

FIG. 1 depicts a functional block diagram of a satellite communications system 10 in accordance with one presently preferred embodiment of the invention. This embodiment of the invention is used in applications that employ continuous or long periods of satellite communication, i.e., non-burst mode. This embodiment of the present invention as shown FIG. 1 can be used in applications that call for broadcast (voice or video) messages, isolated area telephone service, circuit restoral or, large file transfer applications, for example.

System 10 comprises a host 12, a hub equipment package 14, and up to a multiplicity of remote terminals 16. Each remote terminal 16 may be associated with remote baseband equipment 18 at the disposal of a remote user 20. Host 12, hub 14, remote terminals 16, and remote baseband equipment 18 would typically be terrestrially located. In other words, these items would typically be located on or near the surface of the Earth 22.

Host 12 is the source of outbound communication to remote terminals 16 and can be, by way of example, an internet backbone, a communications link into terrestrial voice or video service, a corporate database server, or any of a variety of other systems.

Hub equipment 14 includes a baseband equipment package 24, a hub transmitter 26, a hub receiver 28, and a hub antenna 30. Baseband equipment 24 may be implemented by any of several equipments well known in the art, including a router, a bridge, or a Frame Relay Access Device (FRAD)/switch. Hub transmitter 26 is in communication with baseband equipment package 24 for processing and transmitting the uplink and outbound (hub to remote) signal and is implemented using any of a variety of combinations of hardware well known in the art for transmitting signals via satellite.

For the purposes of the present discussion, the terms "downlink" and "uplink" are defined with reference to a satellite 32. Uplink channels are transmitted from terrestrially-located equipment, such as hub 14 and remote terminals 16, and downlink channels are transmitted from space-based equipment, such as satellite 32. Moreover, the terms "inbound" and "outbound" are defined with reference to hub 14. Inbound communications are directed from remote terminals 16 toward hub 14, and outbound communications are directed from hub 14 toward remote terminals 16. Accordingly, for a star topology where all remote-terminal communications are directed either to or from hub 14, a complete bidirectional communication path would include at least four segments: 1) uplink/inbound, 2) downlink/inbound, 3) uplink/outbound, and 4) downlink/outbound.

In the presently preferred embodiments of the invention, hub transmitter 26 includes an encoder for forward error correction (FEC), a modulator, and a block up-converter (BUC), as well as associated functional blocks such as power sources, tuning devices, and filters that are common and well known in the art for such purposes. Hub transmitter 28 is in communication with hub antenna 30, and hub antenna 30 is in communication with satellite 32. Hub transmitter 28 includes one modulator which is tuned to a predetermined "broadcast" channel for sending uplink/outbound signals toward remotes 16.

Satellite 32 is in communication with hub antenna 30 for downlink/inbound traffic as well. The downlink/inbound satellite signal is received by hub antenna 32 and sent to hub receiver 28. In the presently preferred embodiment of the invention, hub receiver 28 comprises a low noise amplifier (LNA), a multiplicity of demodulators and FEC decoders, and the associated ancillary equipment such as filters, power sources, and tuning oscillators normally utilized in satellite communications in any of a variety of configurations that would be well known by one of ordinary skill in the art. The number of demodulators utilized by hub receiver 28 is determined by the number of communication channels available to system 10. There is one demodulator per downlink channel in the presently preferred embodiment of the invention.

In another embodiment, for certain applications, hub 14 could provide an inverse spectral analysis function, comparable to a spectral analysis function provided in remote terminals 16 (discussed below), and hub 14 could have a limited number of receivers 28 that are assigned on demand (most particularly for video contribution-on-demand).

With one significant exception, host 12 and hub 14 are functionally equivalent to equipment used in the systems of prior art, most notably those systems that employ DAMA methodology. The components used to implement hub 14 of this embodiment of the invention are readily available and known in the art. But one significant difference between hub 14 of system 10 and hubs used in traditional DAMA systems is that the complex, sophisticated, and costly centralized network access controller utilized at hubs in the systems of the prior art is noticeably absent from hub 14 of system 10. This is particularly desirable in a satellite communications system, such as system 10, that is adapted for small-to-medium size networks (i.e., having fewer than 1000 remote terminals 16). The tremendous expense of a centralized network access controller need not be supported by only a relatively small number (i.e., fewer than 1000) of remote terminals, and overall system cost is reduced considerably. Instead of using a centralized network access controller, a network access function in system 10 is distributed using a relatively simple network access controller (discussed below) in each remote terminal 16.

In the preferred embodiment, satellite 32 is a conventional communications satellite located in a geosynchronous orbit about the Earth 22. One consequence of having satellite 32 located in a geosynchronous orbit is that RF electromagnetic communication signals experience about 240 ms of round trip (i.e., earth-to-satellite-to-earth) propagation delay, in addition to other processing delays that may be experienced. This round-trip-propagation delay must be experienced by inbound signals, and it must also be experienced by outbound signals.

As is typical of communications satellites, satellite 32 includes a plurality of transponders 33, with each transponder 33 having a receiver and a transmitter tuned to operate in different frequency bands. It would be typical for 20 to 30 transponders 33 to be carried by satellite 32, but this is no requirement of the present invention. Each transponder uplink and downlink frequency band will typically occupy a bandwidth of the electromagnetic spectrum in the range of 27-72 MHz at a frequency in the range of 3-30 GHz. The entire bandwidth spanned by satellite 32 would typically be in the range of 475-675 MHz. But these details are not critical to the present invention. Transponders 33 may merely receive, translate frequency, amplify, then re-transmit all signals they receive (i.e., a "bent pipe" design). Nothing requires system 10 to be assigned the entire capacity of satellite 32. Rather, system 10 may use only a portion of the bandwidth spanned by all transponders 33 onboard satellite 32.

Figure 2:
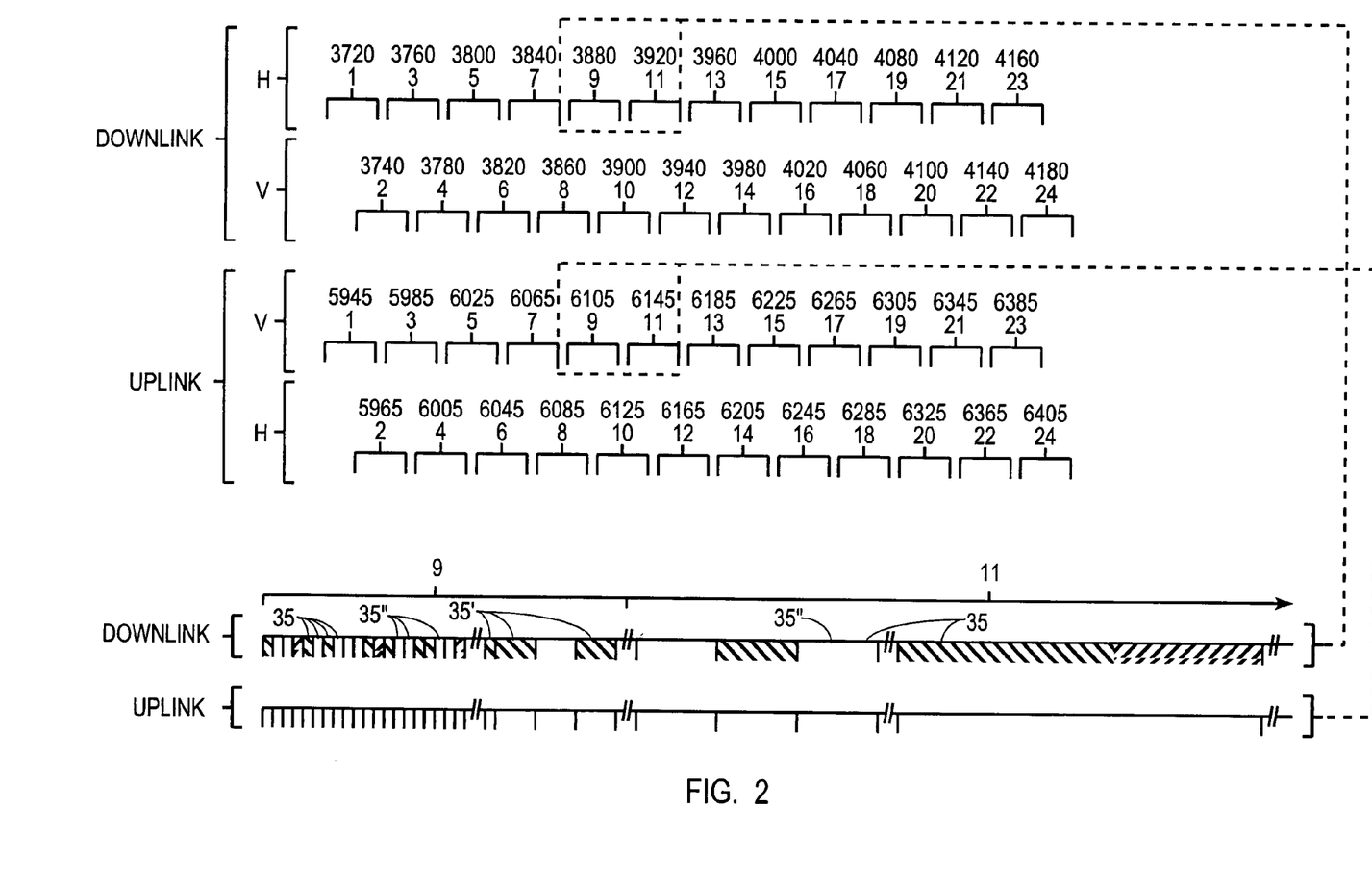
FIG. 2 shows a chart depicting an allocation of the electromagnetic spectrum for one exemplary embodiment of the present invention.

FIG. 2 shows a chart depicting the allocation of the electromagnetic spectrum for an exemplary embodiment of the present invention. This example is consistent with a typical communications satellite 32, but is by no means the only configuration with which system 10 may operate. In this example, satellite 32 includes 24 transponders 33, with odd-numbered transponders having a horizontal polarization and even-numbered transponders having a vertical polarization. Each transponder 33 spans a 36 MHz downlink bandwidth and a 36 MHz uplink bandwidth, with a 4 MHz guard band assigned between each transponder's bandwidth. Vertical polarization transponders 33 occupy bandwidths having center frequencies offset 20 MHz from their adjacent horizontal polarization transponders 33. Consequently, transponders 33 collectively cause satellite 32 to utilize around 500 MHz of spectrum for its downlink plus 500 MHz of spectrum for its uplink. In other words, satellite 32 transmits a broadband downlink signal having a bandwidth of around 500 MHz. Those skilled in the art will appreciate that this broadband downlink signal is a composite of any carriers that may be transmitted by satellite 32 at any given instant, that any number of carriers, from zero to all possible carriers, may be present in this composite signal at any given instant, and that the mix of active carriers may change from instant-to-instant. The downlink spectrum is shown as residing between 3.7 GHz and 4.2 GHz, while the uplink spectrum is shown as residing between 5.925 GHz and 6.425 GHz.

In the example depicted in FIG. 2, two of transponders 33 (shown as transponders 9 and 11) are allocated for use by system 10. This number of transponders is arbitrary, but the greater the portion of the spectrum for satellite 32 that is allocated to system 10, the greater the number of remote terminals 16 that can be supported, the higher-speed communication services that can be provided, and/or the greater the quality of service that can be provided. System 10 allocates the spectrum of these two transponders into a plurality of channels 35. Moreover, different channels 35 may have different bandwidths. For example, some channels 35 may have a bandwidth of around 30 KHz, which is suitable for voice communication and other applications that conventionally communicate over the public switched telecommunications network (PSTN). Others channels 35 may have bandwidths in the 128-512 KHz range, for example, which are useful for medium speed IP services, and still other channels 35 may be allocated in excess of 512 KHz of bandwidth, which would be suitable for high speed IP, file transfer services, and video signals. This is but one example of a range of channel 35 bandwidths which may be allocated for use by system 10. Those skilled in the art may devise other allocations. And, in an alternate embodiment, channel bandwidths may be allocated dynamically rather than using the above-discussed fixed channel bandwidths.

Absent higher-level restrictions, any remote terminal 16 may use any portion of the spectrum allocated for use by system 10. In other words, any remote terminal 16 may use any channel 35 that may be available at any given instant, but in using a channel, the remote terminal 16 refrains from emitting a substantial transmission in any other channel of that spectrum. That way, the allocated spectrum is efficiently utilized because it is shared by all remote terminals 16, it is not dedicated to remote terminals 16 that may not have an immediate need for the spectrum, and it may be shared by many different remote terminals 16 simultaneously.

Referring back to FIG. 1, in the preferred embodiment all remote terminals 16 may, but are not required to, be configured the same with respect to the features and items discussed herein. FIG. 1 depicts details only for a remote terminal 16 labeled "Remote Terminal 1", but the same details apply to other remote terminals 16 as well. While any number of remote terminals 16 may be adapted for use with the present invention, system 10 is directed toward the problem of efficient access control in small-to-medium size networks. Accordingly, the most beneficial results of the system 10 will be realized when system 10 includes fewer than 1000 remote terminals 16.

Remote terminals 16 operate independently of one another. Thus, each remote terminal 16 may generally do the same things as the others, but each operates independently of the others in response only to its own specific situation. Each remote terminal 16 depicted in FIG. 1 includes a remote antenna 34, a remote transmitter 36, a remote receiver 38, a monitor 40, a network access controller 42, and a data interface 44. Remote baseband equipment 18 couple to data interface 44 of remote terminal 16 and are controlled by remote user 20. Remote antenna 34, remote transmitter 36, remote receiver 38, data interface 44, and remote baseband equipment 18 are implemented using components known in the art for use in VSAT networks where continuous or substantially long periods of network access are desired by remote user 20. These networks are those that in the prior art might have used a DAMA network access protocol.

Remote antenna 34 is in communication with remote transmitter 36 in any of a variety of manners well known in the art for uplink transmission to satellite 32. Remote transmitter 36 desirably includes a modulator which may be tuned to correspond to any of a multiplicity of satellite channels as may be assigned to system 10 and be consistent with the demodulation of a corresponding demodulator associated with hub receiver 28. Remote transmitter 36 also desirably includes an FEC encoder consistent with the decoding used by hub receiver 28 and a block up converter (BUC) combined with a solid state power amplifier. Other complementary filters, combiners, power control components, and the like may be included in remote transmitter 36 and configured in any of a variety of manners well known in the art for transmission using a satellite.

Remote transmitter 36 is in communication with a transmission side of data interface 44, and data interface 44 is in communication with remote baseband equipment 18. Remote baseband equipment 18 provides the inbound and outbound remote user interfaces to system 10 and may be implemented with any of a variety of equipment known in the art, including a router, a FRAD, a video encoder, or a stand-alone voice codec. Data interface 44 converts and formats the signal provided it by remote baseband equipment 18 into a signal that is usable by remote transmitter 36 for uplink/inbound communication. These interfaces and communication in the inbound transmitting path are routinely accomplished in a variety of manners known by those of ordinary skill in the art.

Similarly, the downlink/outbound received signal path data interfaces and communication are routinely accomplished in a variety of manners by those of ordinary skill in the art. Remote receiver 38 includes a demodulator tuned to communicate with the modulator of the hub transmitter 26 and consistent with the hub transmitter's modulation technique, an FEC decoder consistent with the encoder of hub transmitter 26, and an LNA, all of which are routinely included in RF communications equipment.

In the preferred embodiment, remote receiver 38 receives the entire spectrum over which satellite 32 broadcasts, or in the alternative, receives the entire portion of the spectrum that is allocated to system 10. Thus, for the example depicted in FIG. 2, remote receiver 38 receives a broadband signal from satellite 32 having a bandwidth greater than the bandwidth of a transponder 33, and that bandwidth may be in the 76-80 MHz range if receiver 38 receives the entire portion of the spectrum allocated to system 10 in the FIG. 2 example, but is preferably at least 200 MHz, and around 500 MHz if remote receiver 38 receives the entire spectrum allocated to satellite 32. Since remote receiver 38 receives the entire spectrum of relevance to system 10, no significant tuning is required. Bandpass filtering, amplification, and downconversion within remote receiver 38 are all configured for this entire spectrum of relevance.

Monitor 40 is in communication with remote receiver 38 and network access controller 42 of remote terminals 16. Monitor 40 keeps track of satellite channel usage activity by monitoring the broadband downlink signal received at remote receiver 38, and monitor 40 provides information to network access controller 42 as to which channels assigned for inbound traffic are currently being used or, alternatively, which channels may be available for use inbound.

Figure 3:
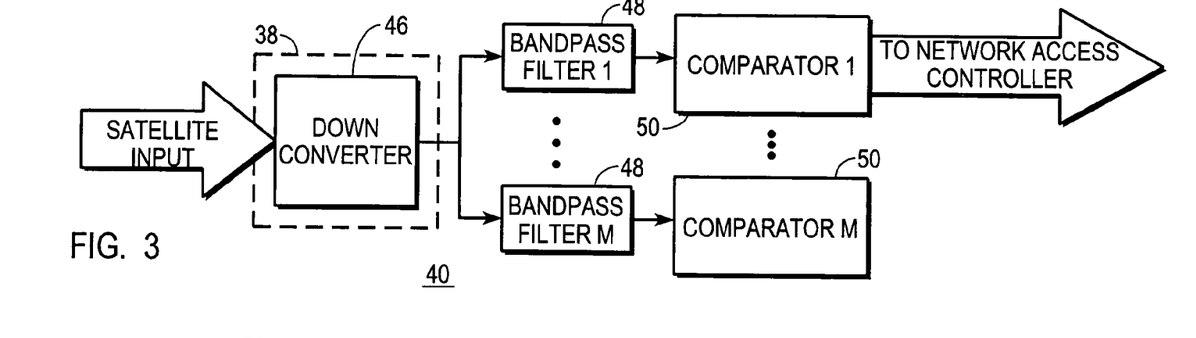
FIG. 3 is a functional block diagram of one embodiment of a monitor portion of the present invention.

FIG. 3 shows a functional block diagram of one embodiment of monitor 40. In the embodiment of monitor 40 depicted in FIG. 3, the received downlink signal from satellite 32 is routed to a down converter 46 within remote receiver 38, through a bank of bandpass filters 48 in monitor 40, thence to a bank of comparators 50. The bandpass filters 48 and comparators 50 are in one-to-one correspondence with the possible downlink satellite channels available for use by the remote terminal 16. If necessary, a tuner (not shown) may scan remote receiver frequency bands corresponding to the downlink channels associated with filters 48. If included, the output of the tuner is converted in frequency to the input frequency range of filter bank 48, and the output of each filter 48 in the bank is used to trigger a comparator when there is a signal within the filter bandwidth, indicating a carrier is present the a corresponding downlink channel. A comparator output corresponding to a signal present within a particular filter 48 bandwidth indicates that the channel is presently in use and, therefore, is not available for use by the remote terminal 16.

Figure 4:
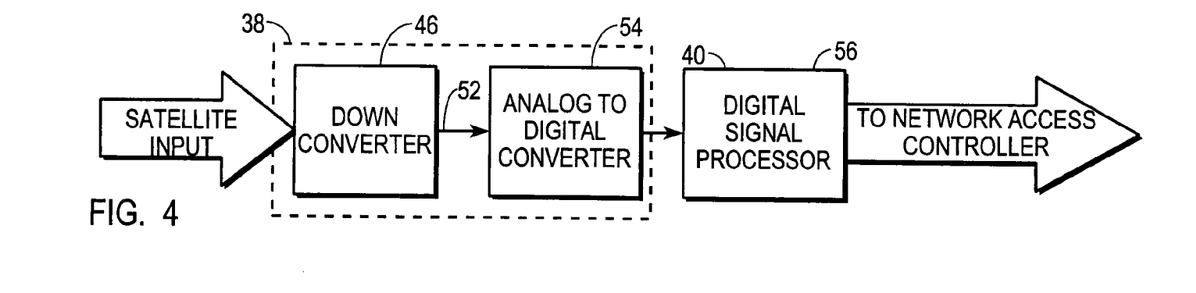
FIG. 4 is a functional block diagram of the presently preferred embodiment of the monitor of the present invention.

FIG. 4 shows a functional block diagram of the presently preferred embodiment of monitor 40. This embodiment utilizes an active processor, specifically a Digital Signal Processor (DSP) such as the TMS32C5544 manufactured by Texas Instruments, Inc., of Dallas, Tex., to analyze the downlink spectral content and, by correspondence, monitor inbound traffic on the network. In particular, a one-to-one correspondence exists between uplink and downlink channels. Thus, by correspondence, when a downlink channel is clear, or unused, a corresponding uplink channel is also clear, round-trip-propagation delay considerations notwithstanding.

The broadband downlink signal is routed to downconverter 46 within remote receiver 38 to form a baseband signal 52. Baseband signal 52 is routed to an analog-to-digital converter 54 (ADC) within remote receiver 38 to convert baseband signal 52 into digital form, and then routed to a DSP 56 which comprises monitor 40 to analyze the digitized baseband signal by performing a spectral analysis.

In particular, DSP 56 analyzes the portion of the electromagnetic spectrum down-converted to baseband in down converter 46 to identify portions of the spectrum in which power is below a predetermined threshold. Of course, those 'skilled in the art will appreciate that the identification of portions of the spectrum in which power is below a predetermined threshold may also be accomplished by doing precisely the opposite: identifying portions of the spectrum in which power is above the predetermined threshold. Those portions which are not above the threshold would be below the threshold and identified in the negative.

Many techniques may be utilized by one skilled in the art to implement the spectral analysis function of monitor 40. The presently preferred embodiment of the invention utilizes a Fast Fourier Transform (FFT), a method well known in the art for filtering and spectral analysis.

Figure 5:
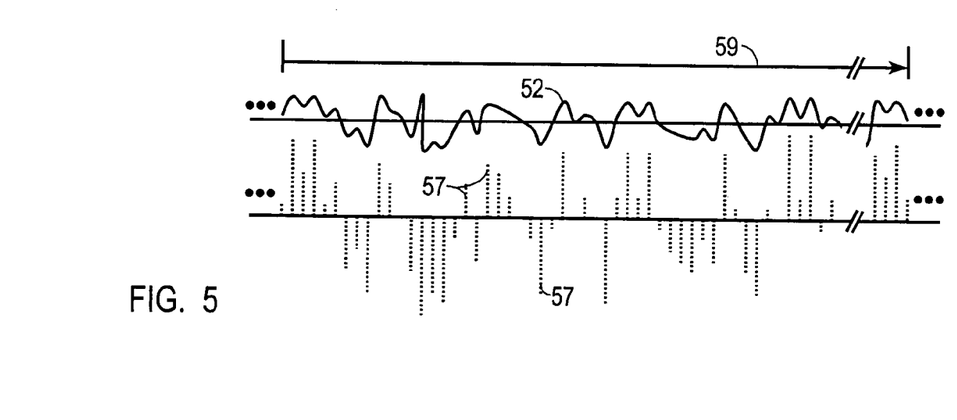
FIG. 5 graphically shows sampling a baseband signal to form a block of samples in accordance with the embodiment depicted in FIG. 4.

FIG. 5 graphically shows sampling a baseband signal to form a block of samples in accordance with the embodiment depicted in FIG. 4. In particular, a broadband, baseband signal 52 is formed from the entire spectrum of relevance to system 10. As discussed above, this spectrum may span more than one transponder 33 (FIG. 1). ADC 54 is controlled to sample baseband signal 52 at a sufficient rate to capture the highest frequency components of this baseband signal 52. Moreover, samples 57 are grouped together into blocks 59 containing a sufficient number of consecutive samples 57 for Fast Fourier Transform (FFT) analysis, in a manner known to those skilled in the art, to achieve a desired frequency resolution over this entire spectrum of relevance.

Monitor 40 is desirably configured to perform an FFT to analyze the spectrum of baseband signal 52. As depicted in FIG. 2, at any given instant some of channels 35, referenced as channels 35' in FIG. 2, may be in use by system 10. In particular, in-use channels 35' result when remote terminals 16 transmit over uplink/inbound channels, which are transponded into downlink/inbound channels by satellite 32. In-use channels 35' represent those transponded downlink/inbound channels. The corresponding uplink/inbound channels are not available for use by any subject remote terminal 16 that is not already using such in-use channels 35'. On the other hand, at any given instant some of channels 35, referenced as channels 35" in FIG. 2, may not be in use by system 10. In particular, clear channels 35" result when no remote terminal 16 transmits over an uplink/inbound channel that would be transponded into the downlink/inbound channels corresponding to clear channels 35" by satellite 32.

The frequency bin resolution of the FFT performed by monitor 40 may be determined by the smallest bandwidth channel allocated for use by system 10. For example, when system 10 uses 30 KHz channels as the smallest channels, then a frequency resolution in the range of 1 KHz to 16 KHz is desirable, with a frequency resolution of around 4 KHz more preferable. Monitor 40 may then compare the power indicated by the FFT for one or more of the central bins of each channel allocated to system 10 to a predetermined threshold or to predetermined thresholds which are suitable for the bandwidth of the channel. Thus, monitor 40 identifies the portions of the baseband signal's spectrum in which power is below a threshold, thereby indicating an available status in the corresponding uplink/inbound channels.

Once this clear spectrum has been identified by monitor 40, monitor 40 desirably forms one or more lists for use in conveying the identified clear spectrum to network access controller 42. Multiple lists or other data associations may be useful in informing network access controller 42 of the bandwidths of the cleared portions of the downlink spectrum. In one embodiment, spectrum allocated by satellite 32 to guard bands between transponder 33 bandwidths may be omitted from such lists because no corresponding uplink/inbound channels exist for such spectrum.

Moreover, monitor 40 and remote receiver 38 are desirably configured to continuously repeat the formation of updated lists of clear spectrum. That way network access controller 42 always has available to it the most-current state of channel usage in system 10. In the preferred embodiment, clear spectrum lists are updated at a rate of more than 200 times per second, and preferably at a rate of more than 900 times per second. Thus, network access controller 42 has knowledge of channel usage in system 10 which is no more than 1-5 ms old.

One of skill in the art can use either embodiment of the monitor described above to scan all the channels in a medium-to-large sized network in extremely short order. This characteristic can then be used to reduce circuit set-up times that plagues the systems of prior art, and, in particular, DAMA systems.

In addition to providing blocks 59 of samples 57 to monitor 40 for spectral analysis, remote receiver 38 also desirably provides blocks of samples to a tuning process that tunes to a downlink/outbound channel used to communicate from hub 14 to remote terminals 16. Such blocks of samples are provided to a demodulator to extract data therefrom, and such extracted data are passed through data interface 44 to remote baseband equipment 18 for use by user 20. Data interface 44 may include a router function which recognizes control data directed to remote terminal 14 and may route such control data to network access controller 42 or other components of remote terminal 16.

Referring once again to FIG. 1, network access controller 42 is in communication with monitor 40, remote receiver 38, remote transmitter 36, and data interface 44. Network access controller 42 receives information from monitor 40 indicating which portions of the downlink spectrum of satellite 32 are in use (or alternatively out-of-use). Network access controller 42 translates this information into other "identity" information that indicates which uplink/inbound channels are available for use by the remote terminal 16.

Network access controller 42 also receives demodulator frequency-offset information from remote receiver 38. As one of skill in the art would realize, monitor 40 may not be able to precisely resolve channel ambiguities in networks with very narrowly spaced carriers and large frequency offsets. The frequency offset information from the demodulator can be used by network access controller 42 to resolve this ambiguity and determine which channels are active in such networks.

Network access controller 42 may be implemented in a variety of manners well known in the art including a personal computer, a microprocessor, or a DSP, to name a few. In the presently preferred embodiment of the invention, the network access controller 42 function is performed by a microprocessor in order to provide for a timing barrier between monitor 40 and the control of remote transmitter 36. It should be noted, however, that the DSP unit that performs the digital spectral analysis of monitor 40 also may be used to implement the logic for network access controller 42.

Figure 6:
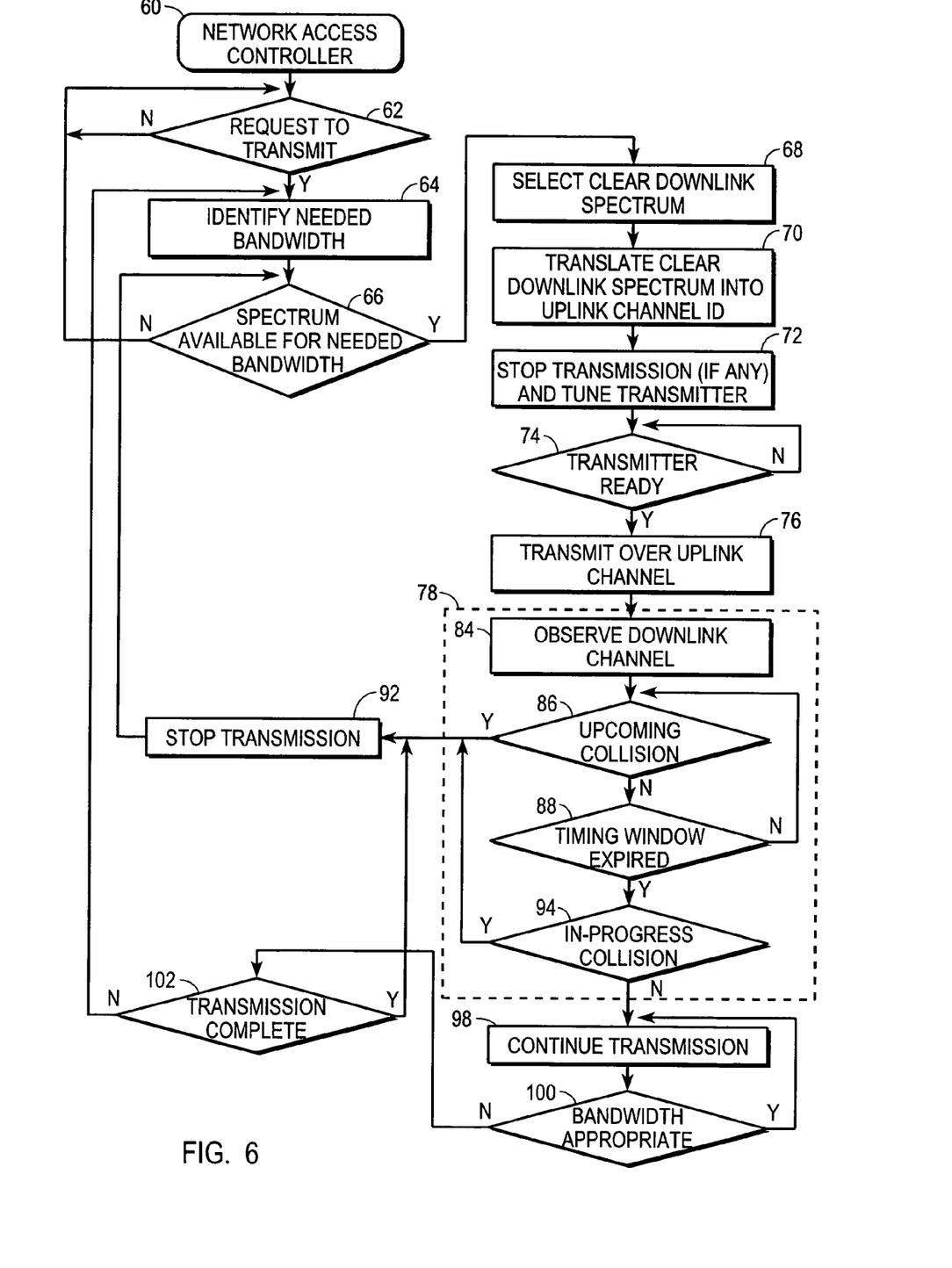
FIG. 6 shows a flow chart of an exemplary process performed by one embodiment of a network access controller portion of the remote terminals depicted in FIG. 1.

FIG. 6 shows a flow chart of an exemplary process 60 performed by one embodiment of network access controller 42.

Referring to FIGS. 1 and 6, network access controller 42 is notified of the need to transmit inbound data from remote terminal 16 by data interface 44. This notification may be of a variety of types. One example of this notification would be via the Ready to Send (RTS) signal generated by many of the standard embodiments of data interface 44 that are well known in the art. Process 60 is depicted as detecting this notification at a query task 62. During task 62, network access controller 42 monitors data interface 44 for notification of the need to establish inbound communication with host 12 via hub equipment 24. This may occur when a user 20 attempts to make a connection that requires an external network. The connection may be a telephone call, or opening a browser and requesting a URL, or any such actions that would cause the network connection request. This may also be an already established connection that is simply sending an occasional data packet. So long as no request-to-transmit notification is received at network access controller 42, program control remains at task 62.

When a request-to-transmit notification is received at task 62, an optional task 64 is performed. During task 64 network access controller 42 identifies the bandwidth needed to fulfill the request. Task 64 may be useful when system 10 is configured to provide a variety of different communication services and when remote baseband equipment 18 are capable providing a variety of different types of information to be communicated. For example, voice typically requires only a low bandwidth connection, video typically requires a high bandwidth connection, and data/file/IP data can utilize a range of connection bandwidth, with more satisfactory performance usually achieved when higher bandwidths are used to communicate larger amounts of data. Task 64 makes an initial determination as to the bandwidth needs based upon the type of remote baseband equipment 18 associated with remote terminal 16 and on signals received therefrom.

After task 64, a query task 66 determines whether sufficient spectrum appears to be available to meet the requested bandwidth. Task 66 may be effected by analyzing the above-discussed lists of available spectrum obtained from, and maintained current by, monitor 40. If the needed bandwidth is not available, then program control returns to task 62, and remains in a loop consisting of tasks 62, 64, and 66 until the spectrum comes available. If desirable, appropriate busy signals may be returned to remote baseband equipment 18.

When task 66 determines that sufficient bandwidth appears to be available to meet the request, then a task 68 is performed. Task 68 evaluates the clear downlink spectrum (i.e., those portions of the spectrum in which power is below a predetermined threshold) lists obtained from monitor 40 and selects a portion of the clear downlink spectrum to translate into an uplink channel which should be available for use. This selection may be a simple process of identifying channels associated with the clear spectrum and sequentially polling for the next available channel. Alternatively, any other suitable algorithm for the selection process may be used. For example, there are a number of schemes used in telephony for acquiring an open line that may be readily utilized by the present invention. As discussed above, with the spectral analysis technique of the DSP-based embodiment of monitor 40, the spectral "scan" of the downlink spectrum may be simultaneously performed on all of the potentially available channels.

Since satellite 32 is located at such a great distance away from the terrestrially-located remote terminals 16, each remote terminal 16 may be deemed as having substantially the same view of satellite 32 as many other remote terminals 16. Thus, many remote terminals 16 operating independently of one another are likely to have formed similar conclusions as to the available spectrum at any given instant. Likewise, many different independently-operating remote terminals 16 are performing similar selection processes in their own tasks 68 for use in identifying a clear uplink channel from this available spectrum. When two or more remote terminals 16 independently desire to access an uplink/inbound channel at around the same time, a collision would occur if they were to select the same channel. A collision occurs when two or more remote terminals 16 simultaneously transmit over the same uplink/inbound channel. The two transmissions interfere with one another, and the hub 14 is unable to successfully receive either transmission.

Accordingly, it is desirable that an element of randomization be introduced into the selection process of task 68 or, in the alternative, that different remote terminals 16 be personalized so that they do not perform precisely the same selection process in task 68 should they wish to obtain access simultaneously. That way the likelihood of simultaneously selecting the same uplink/inbound channels and experiencing a collision may be held to a minimum.

In one embodiment, task 68 is configured to avoid any selection that would correspond to a guard band between transponders 33. And, in one embodiment, network access controller 42 may make its selection at task 68 in accordance with a list of spectrum to avoid or to place at lower priority, perhaps with other restrictions. Thus, system 10 may meet the needs of a high-demand customer or a customer who wishes to pay for guaranteed access by programming all other remote terminals 16 in system 10 with a list of spectrum that is associated with restrictions. Such a list may have timing windows or other limitations associated with spectrum entries so that any such restrictions may be modified by the limitations. The list may be controlled by, and downloaded to remote terminals 16 from, hub 14 on a daily, weekly, monthly, or as-needed basis.

Following task 68, a task 70 translates the clear spectrum in task 68 into an identity for an uplink/inbound channel. This translation may be performed by applying an algorithm, such as adding an offset, by table lookup, or in any other manner known to those skilled in the art.

Next, in a task 72 network access controller 42 directs remote transmitter 36 as to which uplink/inbound channel it will use to transmit. This is accomplished by tuning the modulator of remote transmitter 36 to a specific channel in the presently preferred embodiment of the invention. This tuning activity includes setting-up an appropriate frequency and bandwidth for the specified channel as well as specifying other programmable modulation parameters, such as types of encoding, used for the specific channel. In some circumstances (discussed below) remote terminal 16 may already be transmitting on a different channel when task 72 is initiated. In such circumstances, task 72 also causes such transmissions stop prior to tuning remote transmitter 36. In addition, in such circumstances task 72 may buffer data sufficiently so as to maintain that data for forwarding when a channel change is complete.

After task 72, in a query task 74 network access controller 42 looks for a signal from remote transmitter 36 indicating that the remote transmitter 36 is ready to transmit. Program control remains at task 74 until such a signal is detected. Upon receipt of a ready signal from remote transmitter 36, network access controller 42 notifies user 20 via data interface 44 and remote baseband equipment 18 that the inbound link has been established. This is analogous to receiving a dial tone in telephony. The user is then free to send information to hub 14, and remote terminal 16 transmits the information over the specified uplink/inbound channel at a task 76. By tuning remote transmitter 36 to a specified uplink/inbound channel in task 72 and transmitting over that channel beginning in task 76, remote terminal 16 will occupy the specified channel and refrain from emitting a substantial transmission in any inbound channel other than the specified channel.

In the event that two remote terminals 16 simultaneously attempt to access the same inbound channel by raising their carriers on the same frequency, the channel demodulator of hub receiver 28 will not lock to the transmitted signal and a time-out will occur, (that is, a baseband connection will not be established). This event amounts to the detection of a collision; and, in one embodiment, host 14 may then return a busy indicator for voice or a lost connection for data. The network access controllers 42 for both remote terminals 16 involved in the collision would than resume their independent searches for inactive uplink/inbound channels.

Figure 7:
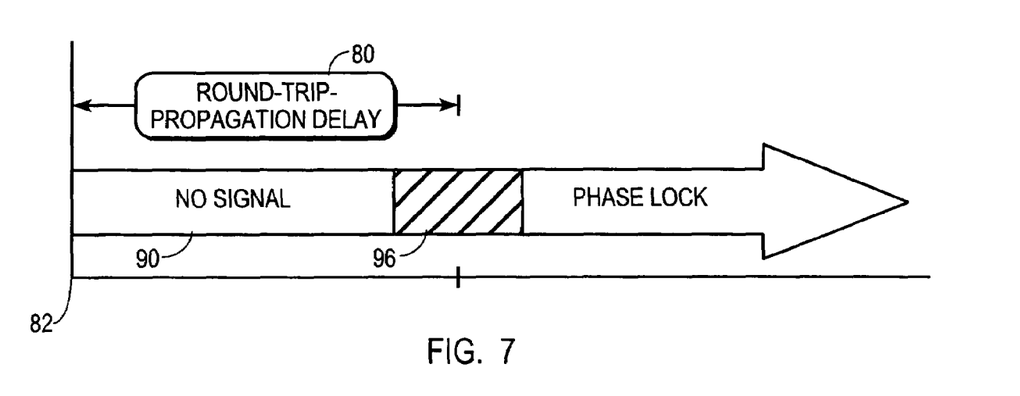
FIG. 7 shows a timing diagram that depicts a timing window employed in one embodiment of one exemplary collision detection subprocess of the process shown in FIG. 6.

FIG. 6 depicts an alternate or additional collision detection subprocess 78 that may be performed in whole or in part by network access controller 42. FIG. 7 shows a timing diagram that depicts a timing window employed in collision detection subprocess 78. A round-trip-propagation delay 80 begins at an instant 82 during task 76 when remote terminal 16 begins to transmit over an uplink/inbound channel it deems to be clear. Within subprocess 78, and while remote terminal 16 is transmitting, a task 84 observes the downlink/inbound channel into which satellite 32 will transpond the uplink/inbound channel over which remote terminal 16 is transmitting. Task 84 may be performed by passing an appropriate instruction to monitor 40 or remote receiver 38 requesting special analysis of the downlink/inbound channel that corresponds to the uplink/inbound channel over which remote terminal 16 is transmitting. In one embodiment, remote receiver 38 or monitor 40 may be instructed to attempt to tune to this downlink channel or to synchronize with a carrier in this channel. Actual demodulation is not a requirement.

At instant 82 and for a round-trip-propagation delay 80 thereafter, subprocess 78 performs a query task 86. At query task 86 no signal should be detected in the specified downlink channel. If no signal is detected, then no upcoming collision is predicted and a query task 88 is performed. Query task 88 determines whether a timing window 90 that is some marginal duration less than round-trip-propagation delay 80 has transpired since instant 82. So long as the timing window has not yet expired, program control loops back to task 86.

If a signal is detected in the specified downlink/inbound channel at task 86, such a signal was most likely transmitted by another remote terminal 16 prior to instant 82 and transponded through satellite 32. No collision has occurred yet, but a collision will occur in the near future when the transmission from the subject remote terminal 16 makes its round trip from earth-to-satellite-to-earth. Thus, when a signal is detected at task 86 an upcoming collision is predicted. In this situation, a task 92 is performed to stop transmission, and program control loops back to task 66, where the channel selection process is restarted.

When task 88 determines that timing window 90 has expired, a query task 94 then investigates whether an actual, in-progress collision is occurring. Task 88 may make its investigation throughout the duration of a timing window 96 that expires a marginal delay after round-trip-propagation delay 80. An in-progress collision may be detected by the failure to achieve synchronization or phase-lock in the specified downlink/inbound channel. When an in-progress collision is detected at task 94, task 92 is performed to stop transmission and restart the channel selection process.

At the end of timing window 96, program control may progress beyond task 94 and exit from collision detection subprocess 78 to a task 98. Task 98 merely continues the transmission. At this point, a future collision may still be expected until another round-trip-propagation delay 80 has transpired, but need not be expected thereafter. But any such collision will be dealt with by the other remote terminal 16 involved in the collision. Desirably, remote terminal 16 will continue transmitting in spite of any collision that occurs during task 98. Depending on the type of data involved, higher-level data communication protocols may request retransmission of any blocks of data that are affected, or the communications may simply risk suffering a brief dropout within about a round-trip-propagation delay 80 following the initial receipt of data.

Task 98 operates in conjunction with a query task 100. Task 100 investigates whether the currently-used bandwidth is appropriate. So long as the current bandwidth is deemed appropriate program control remains in a loop that includes tasks 98 and 100.

During task 100 network access controller 42 may monitor data interface 44 for notification by user 20 that the communications link is no longer desired. At task 100 this notification is interpreted as meaning that the currently-used bandwidth is inappropriate (too high). But task 100 may also conclude that the bandwidth is too low by monitoring the data level in a buffer (discussed below) or by receiving such notification from remote baseband equipment 18.

When task 100 detects an inappropriate bandwidth, a task 102 determines whether transmission is now complete. In other words task 102 determines whether the communications link is no longer needed. If task 102 determines that transmission is complete, program control proceeds to task 92, where network access controller 42 sends a signal to remote transmitter 36 to turn the transmit carrier off. Network access controller 42 then returns to monitoring data interface 42 for an RTS as described above.

An example using a small-to-medium sized network serves to illustrate the bandwidth efficiency of system 10. A scan group of 20 channels occupying 30 KHz each is a typical set up for the small-to-medium'sized network. Remote terminals 16 may be assigned to this scan group at ratios of from three terminals per channel to ten terminals per channel. At three terminals per channel, or a bandwidth re-use of 3 to 1, this group of frequencies would accommodate 60 remote terminals 16. Each channel is capable of passing a 32 Kbps signal at ¾ rate FEC, with quadrature phase shift keying (QPSK) modulation. With compression techniques well known in the art and currently in use, the 30 KHz channel bandwidth will accommodate two voice/fax channels and between 32 and 64 Kbps of data simultaneously. Scan groups are desirably made up of channels that are the same bandwidth. The scan group described above is adequate for most small offices and should provide a grade of service of about 0.1%. The grade of service number refers to a percentage of the Busy Hour Call Attempts or Busy Hour Connection Attempts (BHCA). A 0.1% grade of service means that out of 1000 connection attempts, one will be rejected for a lack of circuit (space segment) availability. This is comparable to public voice services and, because of the bandwidth efficiency of system 10, provides effective data throughput as well.

Compared to the same network architecture implemented with DAMA methodology, the present invention provides the bandwidth efficiency of DAMA with, very nearly, the connection delay of TDMA. By distributing the space segment assignment logic among remote terminals 16, circuit se-up time is drastically reduced when compared to DAMA-based networks, primarily through the elimination of the multiple hops required to establish a circuit connection in the prior art. The same inbound carriers that are used in the prior art are applied in system 10, but inbound traffic assignment for remote terminals 16 is performed independently at each remote terminal 16. The large, costly NMS present at the hub in the prior art is eliminated. Since circuit connection times are drastically reduced in system 10, system 10 is much more readily utilized in IP applications when compared to the DAMA systems of prior art. Additionally, by standardizing the hub demodulator specification and publishing this specification, multiple vendors can produce this network with a variety of standardized equipment.

As will be obvious to one skilled in the art, the system and method of the present invention are independent of modulation technique, FEC rate or method, loop and timing parameters such as lock times, oscillator settling times, and so forth. The networks implementing the system and method of the invention may be optimized for a particular application by the network and component designers by adjusting bandwidth allocation, modulation type, FEC code rate and type, oscillator settling times, tuning times, and the like.

In the embodiment of system 10 as described above and illustrated in FIG. 1, there is a well defined carrier request mechanism at remote terminals 16. This means that the baseband system is matched to the transmission system in its data rate. The request sequence for access to the network is defined for each type of baseband equipment that may be used.

Figure 8:
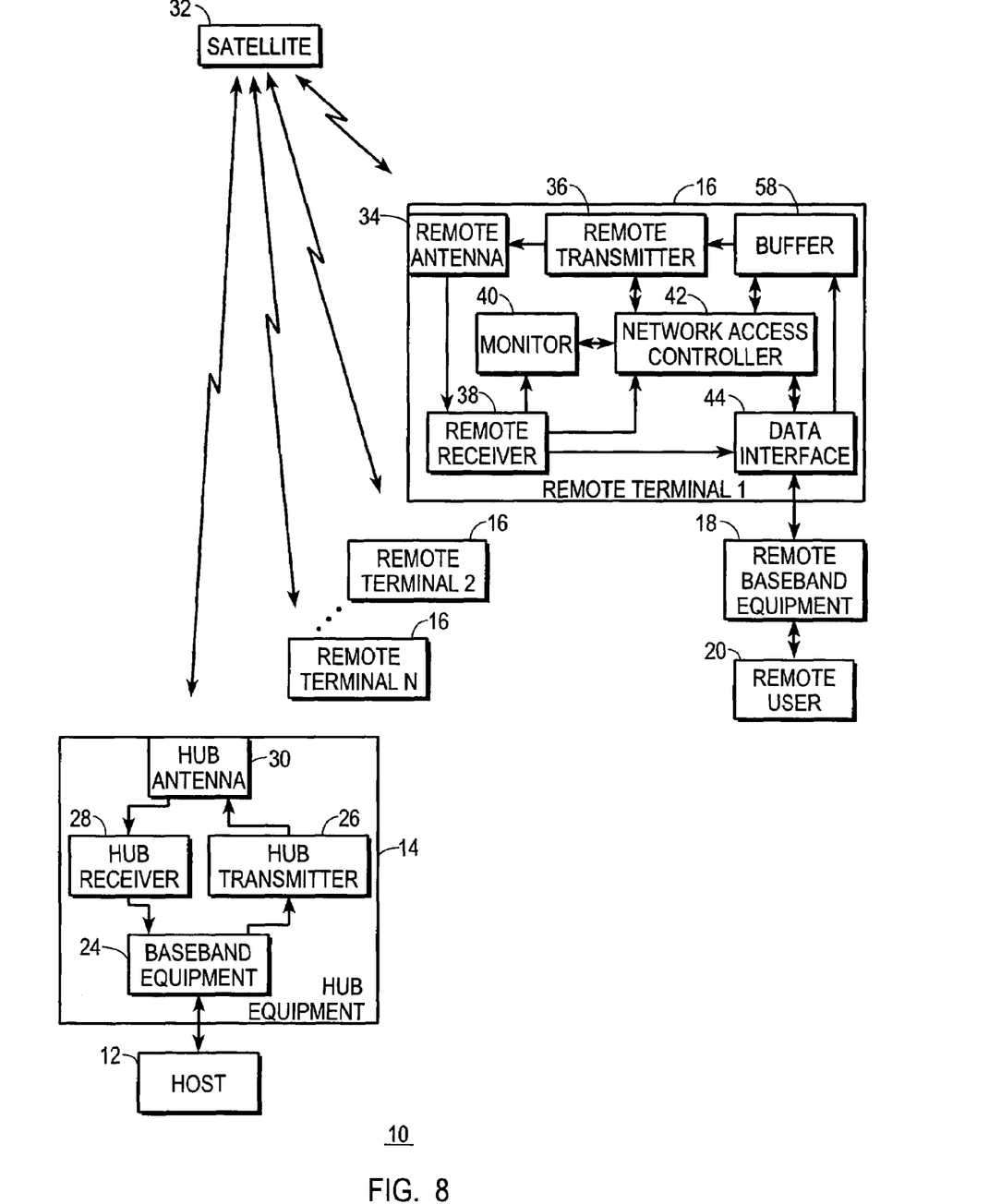
FIG. 8 is a functional system block diagram of a second presently preferred embodiment of the invention.

A second preferred embodiment of system 10 is depicted in FIG. 8. This embodiment allows a universal interface for the inbound transmit data and generates a carrier request for access to the network that is independent of baseband data rate or type. The system architecture utilized in the presently preferred embodiment of the invention shown in FIG. 8 is, with a few exceptions, the same as the architecture shown in FIG. 1.

One exception is reflected in the inclusion of a buffer 58 in remote terminals 16. Buffer 58 receives to-be-transmitted data from data interface 44, communicates control data with network access controller 42, and supplies the to-be-transmitted data to remote transmitter 36. The inclusion of buffer 58 allows the FIG. 8 embodiment of system 10 to operate in either burst or non-burst mode.

When operating in the burst mode, hub baseband equipment 24, hub receiver 28, hub transmitter 26, remote baseband equipment 18, remote transmitter 36, and remote receiver 38 are embodied with equipment designed to operate in the burst mode (e.g., equipment that would be used in TDMA-based systems). A wide variety of this equipment is known in the art and is readily available for use in the FIG. 8 embodiment of system 10. Monitor 40 of FIG. 8 is preferably implemented using the digital spectral analysis technique previously described herein and shown in the block diagram of FIG. 4.

The speed at which the composite downlink spectrum can be effectively analyzed, affects the effectiveness of system 10, especially in the burst mode. The transmission time from a remote terminal 16 is related to the amount of data to be transmitted. A sample calculation illustrates the speed at which system 10 is able to determine an available uplink/inbound channel and activate an uplink/inbound carrier.

Factors affecting the timing of the spectral analysis step are:

| | |
|---|---|
| Acquisition Time | (AT) |
| Processing Time | (PT) |
| Frequency Resolution | (FR) |
| Sampling Rate | (SR) |
| Quantity of FFT Samples | (QS) |
| Velocity of FFT | (FV) |

In this example, the downlink spectrum might be converted down to a center frequency of 30 MHz. With a window size of 7.5 MHz (the typical bandwidth of a tuner), the maximum frequency that will be calculated is 33.75 MHz. The Sampling Rate (SR) is greater than 67.5 MHz, in order to maintain an over-sample rate of at least the 2 to 1 necessary to accurately reconstruct the sample signal. Referring once again to FIG. 4, when the analog-to-digital converter is implemented using a MAX1448 manufactured by Maxim Integrated Products, Inc. of Sunnyvale, Calif. (or equivalent) a Sampling Rate (SR) of 80 million samples per second (MSPS) is available.

Since FR=SR/QS, and, therefore, QS=SR/FR and QS=80,000,000/4882.8=16384 samples needed to do a fall FFT analysis of the spectrum with a resolution of 4.883 kHz.

The Acquisition Time is AT=QS/SR=16,384/80,000,000=1/FR=205 microseconds and the time to calculate the entire spectrum is TC=[QS×$\log_2$ QS]/FV=[16384×14]/320,000,000=229,376/320,000,000=0.717 milliseconds. If the DSP is clocked at 40 MHz then the internal clock is 160 MHz (for the TI TMS320C5544). The DSP can perform parallel operations (instructions) per clock cycle, so that FV=320,000,000 Instructions per Second.

The total time for remote receiver 38 and monitor 40 to acquire the broadband downlink signal and calculate the clear spectrum is the sum of the time to calculate and the acquisition time. In this example, TT=0.717+0.205=0.922 milliseconds or just under 1 millisecond.

Using a readily available remote transmitter 36, the most time consuming step required to complete the operation is the tuning and activation of the modulator in the remote transmitter 16. Based on the transmit carrier activation times of readily available hardware of prior art systems, a modulator can be active and ready to transmit within 20 to 25 milliseconds. This time includes sending and transferring the tuning command to remote transmitter 36, tuning the carrier, and waiting for the output to stabilize frequency and power. The total time for remote terminal 16 of system 10 to find an available uplink/inbound channel and prepare to transmit data to hub 14 over this channel is approximately 25 ms. This time is well within a desirable range for a wide variety of applications that one skilled in the art may be envision by providing for circuit set-up times that are very attractive.

Referring again to FIG. 8, the buffer is in communication with the data interface, the remote transmitter, and the network access controller. When transmitting inbound in the burst mode, data from the remote baseband equipment may be delivered to the remote terminal with slightly different timing and at a slightly different rate than the remote transmitter is ready to accept, the buffer is added to the terminal in order to maintain a substantially constant rate of data flow.

Buffer 58, under direction from network access controller 42, allows system 10 to regulate the flow of data from remote baseband equipment 18 to remote transmitter 36. The controller provides variable timing to data interface 44 and can reduce or increase the rate at which the data is transferred to buffer 58. The transmission rate can be slowed when buffer 58 is nearly full and increased when buffer 58 is remaining nearly empty.

An example of buffer size is illustrative in explaining the function of buffer 58. For instance, if remote transmitter 36 is operating at 128 Kbps and data from baseband equipment 18 is flowing to remote terminal 16 at 64 Kbps, buffer 58 implements approximately 25 milliseconds of delay for the tune and transmit time (as previously described) plus some lock time for the hub demodulator at the other end of the circuit. In one preferred embodiment of the invention, a string of contiguous High-Level Data Link Control (HDLC) flags are transmitted under the control of network access controller 42 to provide a signal that will allow the hub demodulator to lock prior to valid data transmission. This action is acceptable to any of the systems well known and used in the art. If approximately 40 milliseconds is allowed for demodulator lock at the hub, a total of 65 milliseconds buffer space at 128 Kbps accommodates the delay between data input to the remote terminal and actual data transmission over the network. This translates to 8320 bits in buffer 58. The minimum burst size to produce at least the 8320 bits would be 95 milliseconds (190 milliseconds at 64 Kbps). Once system 10 is transmitting, buffer 58 may be bypassed to transmit data as fast as it enters the interface. If desired, network access controller 42 can increase the rate at which data is sent from remote baseband equipment 18.

The method employed by network access controller 42 in conjunction with buffer 58 when system 10 is used in the burst mode is more complex than the method previously described for the non-burst application.

Network access controller 42 monitors buffer 58 for activity indicating that user 20 has initiated the sending of data, resulting in buffer 58 beginning to fill. When the contents of the buffer 58 reaches a first predetermined level, network access controller 42 retrieves the available spectrum information from monitor 40 and translates this information into an identity of an available uplink/inbound channel. Once the uplink/inbound channel has been selected, network access controller 42 directs the modulator in remote transmitter 36 to tune to that channel and to activate the transmit carrier. Network access controller 42 then looks for a signal from remote transmitter 36 indicating that remote transmitter 36 is ready to transmit. Controller 42 may send a signal, a demodulator preamble for example, to hub 14 via remote transmitter 36 in order that a hub receiver 28 may lock to remote transmitter 36. Network access controller 42 then directs the buffered data to remote transmitter 36. Network access controller 42 then monitors the buffer activity and, if buffer 58 is maintaining a substantially constant fill level, or is decreasing in fill level, no action is taken by controller 42. When the buffer fill status reaches a second predetermined level (e.g., empty), controller 42 may turn remote transmitter 36 off. At this point, the previously-occupied uplink/inbound channel will come available for use by other remote terminals 16.

If the buffer fill status is increasing, network access controller 42 may request availability of a higher bandwidth channel from monitor 40. Network access controller 42 then identifies a higher-data-rate channel based on information received from monitor 40 and halts data flow to remote transmitter 36, allowing enough remaining buffer space to allow returning of the modulator.

The controller sends the channel change information to remote transmitter 36 and repeats the carrier activation and hub receiver locking sequence. When the uplink/inbound carrier is activated and the hub receiver 28 locking signal has been initiated by controller 42, the buffer output is again directed to remote transmitter 36 at the higher clock speed. The transmission continues until controller 42 detects that buffer 58 is emptied and remote terminal 16 then reverts to the quiescent configuration.

Network access controller 42 monitors the activity of baseband equipment 18 via data interface 44, and when data stops flowing from baseband equipment 18 or when the connection is terminated by user 20, remote transmitter 36 is turned off and remote terminal 16 reverts to the quiescent configuration.

It is advantageous for small-to-medium size networks that the embodiment of system 10 shown in FIG. 8 and as described above for use in burst applications, may also be used in the non-burst mode. In this case, the data transmissions are simply long burst, and buffer 58 remains a substantially the same fill level throughout the transmission. System 10, therefore, provides far grater flexibility and adaptability to different communication types that any system of prior art.

It should be noted that a variety of other embodiments of system 10 are envisioned. For example, if large file transfers and large e-mail attachments create a situation where the throughput is not high enough using the assigned channel, the circuit would remain busy for a long time to pass the data. In order to prevent this, a second group of channels may be added. The additional channels allow a higher data rate carrier, one that is more suited for larger file transfers, or even video conferencing. One of the possible configurations for the system is to assign permanent channels to certain high traffic stations during part of the day. This allows the high traffic points to be constantly connected during their busy hours. A timed reconfiguration can return these stations to the normal scanning mode after their peak traffic hours are past.

Another advantage of system 10 is that it is readily adaptable for mesh networks, where each remote terminal 16 has single satellite "hop" connectivity with any other terminal 16 in the network. In an embodiment of system 10 where each remote terminal 16 has two demodulators as a part of its remote receiver 38, mesh connectivity can be established. For example, once the carrier is up, network access controller 42 requests the second demodulator at the second remote site. This forms a single hop connection between the remotes for voice or data connections, creating a demand assigned full mesh network.

An advantage of the distributed network access control afforded by system 10 is that in mesh systems, the burst format can be used to allow very large numbers of stations to participate without a large capital investment in each station. The system designer can create "Communities of Interest" by adding extra demodulators to the remote receivers and then assigning the remote terminals to common channel groups for interconnectivity.

In high speed access remote terminals 16, such as video contribution networks, a specified level of quality for the video (i.e.—Standard Definition versus High Definition Video) is requested, and network access controller 42 and monitor 40 search for an uplink/inbound channel consistent with the requested service. As noted previously, an alternative method for this is to implement a monitor 40 in hub 14 that looks for traffic in an unassigned pool and analyzes that bandwidth for any active channel. Once an active channel is detected, a demodulator may be tuned to that channel and matched in FEC rate and data rate to the incoming carrier.

Distributing the network control among remote terminals 16 and providing for remote network access independent of hub 14 provides an enormous amount of adaptability to a wide variety of network topologies. This adaptability allows common hardware to be used for many topologies, making standardization of hardware much more feasible than provided for in the systems of prior art.

From the foregoing, it can be seen that the embodiments of system 10 offer a number of advantages. System 10 requires reduced hardware and software capital investment, utilizes bandwidth effectively, and is cost effective to operate. System 10 also provides for networks with short set-up times and that maintain high throughput characteristics in the presence of increased communication traffic. Satellite telecommunications systems in accordance with the present invention are adaptable to a wide variety of communication types, are both scalable and extensible, and are readily standardized.

While certain preferred embodiments and methods of the invention have been described, these have been presented by way of example only, and are not intended to limit the scope of the present invention. Additional advantages and modifications will readily occur to those skilled in the art. Therefore, the invention in its broader aspects is not limited to the specific embodiments, methods and conditions described herein, which are not meant to and should not be construed to limit the scope of the invention. Accordingly, departures may be made from such embodiments and methods, variations may be made from such conditions, and deviations may be made from the details described herein without departing from the spirit or scope of the general inventive concept as defined by the appended claims and their equivalents.

What is claimed is:

1. In a satellite communications system, a method of accessing channels comprising:
   receiving a broadband signal occupying a predetermined portion of the electromagnetic spectrum and broadcast by a satellite to include a plurality of downlink channels;
   identifying a portion of said spectrum of said broadband signal in which power is below a predetermined threshold;
   translating said portion of said spectrum of said broadband signal in which power is below said predetermined threshold into an identity of an uplink channel; and
   transmitting a communication to said satellite using said uplink channel identified in said translating activity.

2. A method as claimed in claim 1 wherein:
   said satellite includes a plurality of transponders wherein each transponder transmits in a portion of the electromagnetic spectrum defined by a transponder bandwidth; and
   said receiving activity processes a signal having a bandwidth greater than said transponder bandwidth.

3. A method as claimed in claim 1 wherein each of said plurality of downlink channels occupies a different portion of the electromagnetic spectrum than is occupied by others of said plurality of downlink channels.

4. A method as claimed in claim 1 wherein:
   said satellite communications system includes a plurality of remote terminals; and
   said receiving, identifying, translating, and transmitting activities are independently performed at each of said plurality of remote terminals.

5. A method as claimed in claim 4 wherein
   said satellite communications system includes fewer than 1000 remote terminals.

6. A method as claimed in claim 1 wherein said identifying activity comprises:
   sampling said broadband signal to form a block of samples;
   performing a Fourier transform on said block of samples.

7. A method as claimed in claim 6 wherein said performing activity has a frequency resolution of between 1 KHz and 16 KHz.

8. A method as claimed in claim 1 wherein:
   said satellite includes a plurality of transponders wherein each transponder transmits in a portion of the electromagnetic spectrum defined by a transponder bandwidth;
   said receiving activity receives a signal occupying a bandwidth greater than said transponder bandwidth; and
   said identifying activity is repeated at a rate of more than 200 times per second.

9. A method as claimed in claim 1 wherein said transmitting activity accommodates burst and non-burst formats.

10. A method as claimed in claim 1 wherein said transmitting activity comprises:
    tuning a transmitter to said uplink channel identified in said translating activity; and
    refraining from emitting a substantial transmission in any channel other than said uplink channel identified in said translating activity.

11. A method as claimed in claim 1 additionally comprising:
    detecting, after initiating said transmitting activity, a collision in said uplink channel identified in said translating activity; and
    repeating said receiving, identifying, translating, and transmitting activities if said collision occurs.

12. A method as claimed in claim 11 wherein said detecting activity occurs during a timing window that begins with said transmitting activity and extends for at least a round-trip-propagation delay of an electromagnetic signal propagating to said satellite and back.

13. A satellite communications system comprising:
    a communications satellite positioned in an orbit about the Earth; and
    a plurality of remote terminals wherein each of said remote terminals is configured to independently receive a broadband signal occupying a predetermined portion of the electromagnetic spectrum, to identify a portion of said spectrum of said broadband signal in which power is below a predetermined threshold, to translate said portion of said spectrum of said broadband signal in which power is below said predetermined threshold into an identity of an uplink channel, and to transmit to said satellite using said uplink channel;

wherein each of said remote terminals includes a receiver and a monitor, each receiver is configured to sample said broadband signal to form a block of samples, and each monitor is configured to perform a Fourier transform on said block of samples.

14. A satellite communications system as claimed in claim 13 wherein:
said satellite includes a plurality of transponders wherein each transponder transmits in a portion of the electromagnetic spectrum defined by a transponder bandwidth; and said
receivers included in said remote terminals are configured to receive an electromagnetic signal having a bandwidth greater than said transponder bandwidth.

15. A satellite communications system as claimed in claim 13 wherein said communications system includes fewer than 1000 of said remote terminals.

16. A satellite communications system comprising:
a communications satellite positioned in an orbit about the Earth, wherein said satellite includes a plurality of transponders wherein each transponder transmits in a portion of the electromagnetic spectrum defined by a transponder bandwidth; and
a plurality of remote terminals wherein each of said remote terminals is configured to independently receive a broadband signal occupying a predetermined portion of the electromagnetic spectrum, to identify a portion of said spectrum of said broadband signal in which power is below a predetermined threshold, to translate said portion of said spectrum of said broadband signal in which power is below said predetermined threshold into an identity of an uplink channel, and to transmit a communication to said satellite using said uplink channel;
wherein, each of said remote terminals includes a receiver configured to receive an electromagnetic signal having a bandwidth greater than said transponder bandwidth; and
wherein, each of said remote terminals includes a monitor coupled to said receiver and configured to repetitively identify portions of said spectrum of said broadband signal in which power is below said predetermined threshold, with repetitions occurring at a rate of more than 200 times per second.

17. A satellite communications system as claimed in claim 13 wherein each of said remote terminals is further configured to detect a collision in said uplink channel by observing a downlink channel which occupies said portion of said spectrum of said broadband signal and to identify another uplink channel if said collision occurs.

18. A communications system comprising:
a terrestrially-located hub terminal;
a communications satellite positioned in a substantially geosynchronous orbit about the Earth, said communications satellite transmitting over a portion of an electromagnetic spectrum that spans a bandwidth of more than 200 MHz and is divided into a plurality of downlink channels;
fewer than 1000 terrestrially-located remote terminals in communication with said hub terminal through said communications satellite, wherein each remote terminal comprises:
a receiver configured to receive an electromagnetic signal having a bandwidth of more than 200 MHz and to sample said electromagnetic signal to form a block of samples;
a monitor coupled to said receiver and configured to identify portions of said bandwidth in which power is below a predetermined threshold;
a network access controller coupled to said monitor and configured to translate said portions of said bandwidth into identities of corresponding uplink channels; and
a transmitter coupled to said network access controller and configured to be tuned to and transmit over one of said uplink channels.

19. A communications system as claimed in claim 18 wherein:
said receiver is configured to form blocks of said samples at a rate of more than 200 blocks per second; and
said monitor is configured to repetitively identify said portions of said bandwidth in which power is below a predetermined threshold a rate of more than 200 times per second.

20. A satellite communications system as claimed in claim 16 wherein each of said remote terminals is further configured to detect a collision in said uplink channel by observing a downlink channel which occupies said portion of said spectrum of said broadband signal and to identify another uplink channel if said collision occurs.

* * * * *